A. W. & E. BLANK.
CORN PLANTER ATTACHMENT.
APPLICATION FILED APR. 18, 1913.
1,119,675.
Patented Dec. 1, 1914.
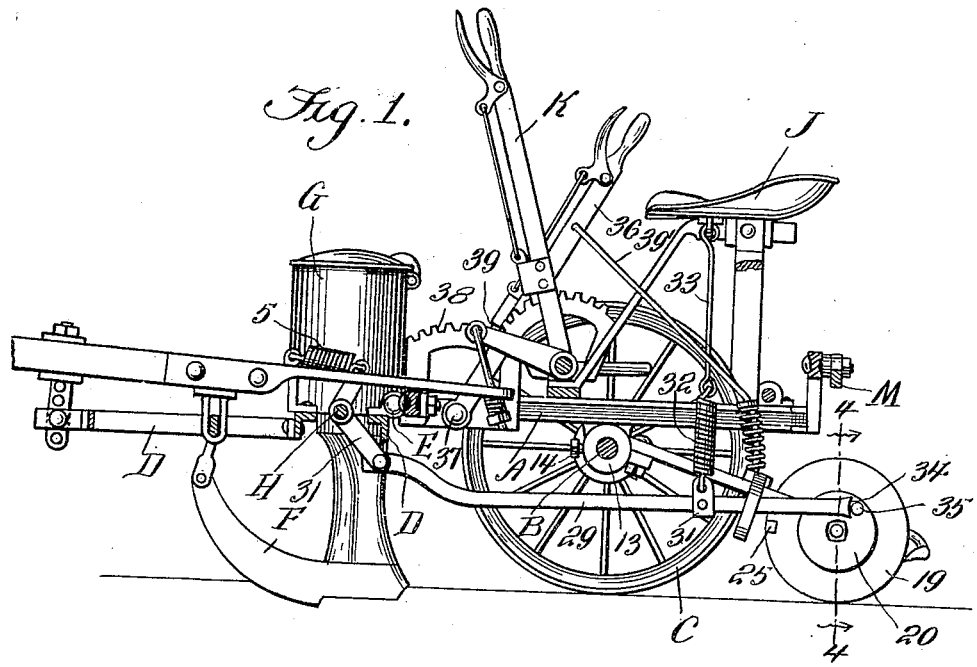
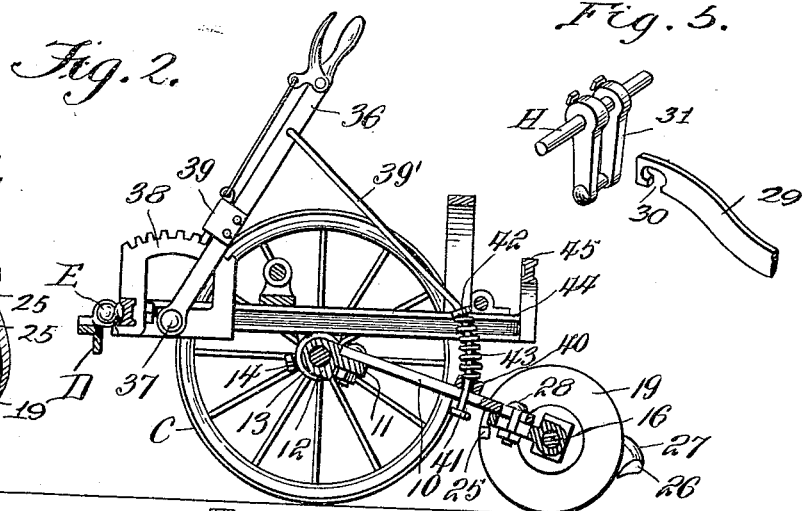
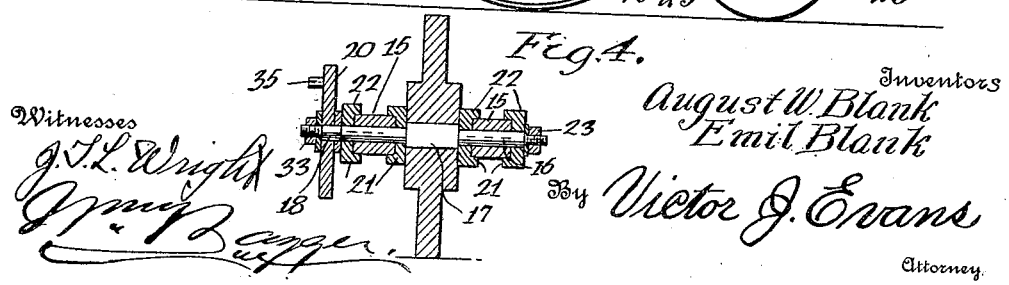
Inventors
August W. Blank
Emil Blank
By Victor J. Evans
Attorney
Witnesses

UNITED STATES PATENT OFFICE.

AUGUST W. BLANK AND EMIL BLANK, OF WEBSTER, SOUTH DAKOTA.

CORN-PLANTER ATTACHMENT.

1,119,675.  Specification of Letters Patent.  Patented Dec. 1, 1914.

Application filed April 18, 1913. Serial No. 762,067.

*To all whom it may concern:*

Be it known that we, AUGUST W. BLANK and EMIL BLANK, citizens of the United States, residing at Webster, in the county of Day and State of South Dakota, have invented new and useful Improvements in Corn-Planter Attachments, of which the following is a specification.

This invention relates to check row attachments for corn planters, and it has for its object to produce a check row attachment of simple and improved construction whereby the use of the customary chains may be entirely dispensed with.

A further object of the invention is to produce a simple and improved check row attachment which may be easily and conveniently thrown into and out of gear so as to interrupt the planting whenever desired, such as when the turn is being made at the end of the row.

A further object of the invention is to provide a check row attachment including simple and improved means whereby the point at which to begin operations at the beginning of a row may be correctly ascertained.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a longitudinal sectional view of a machine constructed in accordance with the invention. Fig. 2 is a longitudinal vertical sectional view taken on a different plane. Fig. 3 is a perspective detail view of the gage wheel which constitutes a part of the improved check row attachment. Fig. 4 is a sectional detail view taken on the line 4—4 in Fig. 1. Fig. 5 is a perspective detail view showing the crank of the seed shaft, together with the forward end of the actuating rod, the latter being detached from the crank.

Corresponding parts in the several figures are denoted by like characters of reference.

The main frame of the planter is supported on the axle B having the ground engaging wheels C. The runner frame D which is pivotally supported at E carries the runners F, the seed boxes or hoppers G and the seed dropping mechanism which includes a rock shaft H which is actuated in one direction by a spring 5. The main frame carries a seat J for the driver or operator, and suitably mounted on said main frame is the customary hand lever K whereby the runner frame may be raised or lowered.

The improved check row attachment includes a frame having side members 10, the forward ends of which are bolted or otherwise secured on a flange 11 formed on a sleeve or boxing 12 which is loosely mounted on the main axle B of the machine, said sleeve being secured against displacement longitudinally of the axle by means of collars 13 having set screws 14 whereby they are secured in position. Bolted on the rear ends of the side bars 10 are boxes 15 affording bearings for a shaft 16, said shaft having intermediate its ends a squared or non-circular portion 17 and near one end another squared or non-circular portion 18, said non-circular portions supporting, respectively, the operating wheel 19 and the tappet wheel 20. Washers 21 having flanges 22 that embrace the boxes 15 serve to properly space the parts on the shaft 16, which latter is terminally threaded and provided with nuts 23, whereby the parts are properly assembled in such a manner that the shaft 16 carrying the operating wheel and the tappet wheel may freely rotate in the boxes or bearing members 15. The operating wheel 19, the circumference of which is equal to the required distance between the hills, is provided with a recess wherein a marker 25 is seated in such a manner that no portion of said marker will project beyond the perimeter of the wheel, thus offering no obstruction to the operation of the scraper 26 which is supported by a rod 27 connected with one of the frame bars 10. It is obvious that the operating wheel must be so positioned that the marker 25 will engage the ground to make the mark at the exact time when the seed is dropped by the seed dropping mechanism in advance of the operating wheel, and also that the mark made by the operating wheel must be precisely one hill in rear of the hills which are being planted, although located intermediately therebetween. In order that adjustment with this end in view may be properly made it is desirable that the boxes 15 be adjustably connected with the side members 10 by providing longitudinal slots for the passage of the bolts or fastening members 28.

An operating rod or bar 29 is provided having near its front end a T-shaped notch 30 adapted to engage a crank 31 on the rock shaft H which constitutes the operating shaft of the seed dropping mechanism. The rod 29 is supported in a stirrup 31 carried by a spring 32 which has been shown as being suspended by means of a link rod 33 beneath the driver's seat J; it being, however, of course, understood that a separate supporting bracket may be provided when required. The rear end of the rod or bearing 29 has a concave recess 34 which is disposed in the path of the tappet 35 that extends laterally from the tappet wheel 20 so that by each rotation of said tappet wheel, the rod 29 will be pushed or moved in a forward direction, thereby actuating the rock shaft H against the tension of the spring 5, which latter serves to restore said rock shaft to its initial position when the rod 29 is released from engagement with the tappet, the rod 29 being then retracted by the spring 32, whereby it is resiliently supported for a repetition of the operation.

For the purpose of lifting the operating frame to move the operating wheel clear of the ground for the purpose of interrupting the planting, means are provided including a lever 36 fulcrumed at 37 on a stand which includes a rack segment 38 which is engaged by a stop member 39 carried by the lever. Pivotally connected with the hand lever 36 is one end of a lifting rod 39', the other end of which is guided through a lug 40 on one of the side bars 10 and is provided with a terminal stop member 41, thus enabling the operating frame to be lifted by means of the lever 36. Coiled on the lifting rod 39 between the lug 40 and a stop collar 42 is a spring 43, the tension of which is exerted to force the operating frame and the operating wheel in the direction of the ground, holding the rim of the operating wheel in ground engaging position with sufficient force to insure the rotation of the wheel when the machine is in operation, but not sufficiently to prevent the wheel from passing over stones and other obstructions in the path thereof. The rear cross bar 44 of the planter frame has been shown as being provided with an arch 45 or upwardly offset portion to accommodate the gage wheel when the operating frame is elevated to throw the planting mechanism out of operation.

From the foregoing description, taken in connection with the drawings hereto annexed, the operation and advantages of this invention will be readily understood by those skilled in the art to which it appertains. It will be seen that by this attachment which is simple in construction and substantially automatic in its operation, the use of the chains heretofore employed to actuate check row corn planters may be dispensed with, thereby avoiding the labor and annoyance of shifting the chains at the end of each row and at the same time enabling the corn to be planted in check rows with the utmost accuracy and certainty and without constant supervision on the part of the driver who is merely required to follow the marks made by the previous round of the machine.

In applying the improvement to various types of corn planters various minor changes may be required, but such changes will be held to be within the scope of the appended claims.

Having thus described the invention, what is claimed as new, is:—

1. The combination with a corn planter having an operating shaft supported for oscillation, and a retracting spring for said shaft, of a check row attachment including a frame supported pivotally on the axle of the machine, a shaft supported for rotation on said frame, an earth engaging operating wheel and a tappet wheel carried by said shaft, said tappet wheel having a laterally extending tappet, a resiliency supported stirrup carried by the planter frame, a crank on the operating shaft of the planter, and an operating rod supported in the stirrup, said operating rod being connected at its forward end with the crank on the operating shaft and having its rearward end disposed in the path of the tappet.

2. In a device of the class described, the combination with a corn planter having an operating shaft supported for oscillation and a retracting spring for said shaft, of a crank mounted on the operating shaft, a frame pivoted on the axle of the corn planter, a shaft mounted for rotation on said frame and carrying an operating wheel and a tappet wheel, the latter having a laterally extending tappet, a spring, a link connected with the planter frame and supporting said spring, a stirrup carried by the spring, and an operating rod supported by the stirrup, said rod connected at its front end with the crank on the operating shaft and having its rearward end disposed in the path of the tappet.

In testimony whereof we affix our signatures in presence of two witnesses.

AUGUST W. BLANK.
EMIL BLANK.

Witnesses:
WM. BAGGER,
BENNETT S. JONES.